United States Patent [19]

Kyu et al.

[11] Patent Number: 4,743,654

[45] Date of Patent: May 10, 1988

[54] SINGLE PHASE BLENDS OF POLYCARBONATE AND POLYMETHYL METHACRYLATE

[75] Inventors: Thein Kyu; Jeanne M. Saldanha, both of Akron, Ohio

[73] Assignee: University of Akron, Akron, Ohio

[21] Appl. No.: 930,296

[22] Filed: Nov. 13, 1986

[51] Int. Cl.$^4$ .............................................. C08L 69/00
[52] U.S. Cl. .................................. 525/148; 525/146; 525/468
[58] Field of Search ........................ 525/148, 146, 468

[56] References Cited

U.S. PATENT DOCUMENTS

| | | | |
|---|---|---|---|
| Re. 31,165 | 3/1983 | Serini et al. | 525/67 |
| 3,143,525 | 8/1964 | Ott | 260/47 |
| 3,461,187 | 8/1969 | Cantrill | 260/873 |
| 3,506,739 | 4/1970 | Cantrill | 260/873 |
| 3,742,088 | 6/1973 | Holder et al. | 260/873 |
| 3,801,673 | 4/1974 | O'Connell | 260/873 |
| 3,957,921 | 5/1976 | Iwahashi et al. | 260/901 |
| 3,975,485 | 8/1976 | Bollen et al. | 264/171 |
| 4,029,631 | 6/1977 | Bollen et al. | 260/40 R |
| 4,045,514 | 8/1977 | Iwahashi et al. | 260/873 |
| 4,107,251 | 8/1978 | Bollen et al. | 264/171 |
| 4,230,656 | 10/1980 | Amin et al. | 264/171 |
| 4,257,937 | 3/1981 | Cohen et al. | 260/40 R |
| 4,319,003 | 3/1982 | Gardlund | 525/148 |
| 4,478,981 | 10/1984 | Arkles | 525/92 |
| 4,506,045 | 3/1985 | Waniczek et al. | 524/31 |
| 4,515,921 | 5/1985 | Witman | 525/67 |
| 4,595,729 | 6/1986 | Fox et al. | 525/147 |

OTHER PUBLICATIONS

Gardlund, Z. G., *Polymer Preprints*, American Chemical Society, vol. 23, pp. 258–259, (1982).
Gardlund, F. G., American Chemical Society *Advances in Chemistry* Series, 206, Chap. 7, pp. 129–148, (1984).
Koo, K. K. et al., *Polym. Eng. Sci.*, vol. 27, pp. 741–746, (1985).
Nishi, Toshio, *CRC Critical Reviews in Solid State and Materials Science*, vol. 12, issue 4, (date unknown).

Primary Examiner—Theodore E. Pertilla
Attorney, Agent, or Firm—Oldham, Oldham & Weber Co.

[57] ABSTRACT

Clear, transparent, single phase blends of polycarbonate and a polyalkyl methacrylate in which the alkyl radical contains from 1 to about 10 carbon atoms, and in which the polycarbonate and the polyalkyl methacrylate are miscible in all proportions are obtained. Polymethyl methacrylate (PMMA) is the preferred polyalkyl methacrylate. These blends may be prepared by dissolving the two polymers in a mutual solvent having a boiling point of at least about 30° C. and evaporating the solvent at a temperature of from about 30° C. to the boiling point of the solvent. The preferred evaporation temperatures are from about 45° C. to the boiling point of the solvent. This is in contrast to presently known PC/PMMA blends, which are miscible only when the content is nearly all PC or nearly all PMMA. Preferred blends according to this invention contain from 10 to 80 percent by weight of PC and conversely 90 to 20 percent by weight of PMMA. The single phase blends are moldable and transparent.

15 Claims, No Drawings

SINGLE PHASE BLENDS OF POLYCARBONATE AND POLYMETHYL METHACRYLATE

TECHNICAL FIELD

This invention relates to polymer blends and more particularly to blends of polycarbonate and polymethyl methacrylate which are miscible in all proportions.

BACKGROUND ART

Polycarbonate (PC) exhibits high ductility (high impact strength), temperature stability over a broad temperature range, high stiffness, good dimensional stability, good electrical properties and a glass-like transparency. This material enjoys widespread use in various automotive applications, including headlamps, tail and sidemarker lights, and instrument panels. Polycarbonate is also used in bus windows and interior panels. Other uses include returnable milk bottles and electrical connectors. A potential use is in compact disks. The combination of high optical clarity and low breakability make polycarbonate a highly desirable material in certain applications such as automobile headlamps and tail lights and bus windows mentioned above. One drawback is that polycarbonate exhibits birefringence.

Polymethyl methacrylate (PMMA) also exhibits high optical clarity. In addition, polymethyl methacrylate also possesses good weatherability, good electrical insulating properties, good machineability and ease of assembly (e.g. by cementing or ultrasonic welding), and resistance to a variety of chemicals including acids, alkalies and household detergents. Dimensional stability is not outstanding, on the other hand. Uses of PMMA are many and varied. They include for example, automotive and bicycle lenses, table articles such as tumblers, aviation windows and canopies, skylights, retail displays, outdoor table tops, and window and door panels. The low level of birefringence of PMMA makes this material suitable for video disks and compact disks. However, the comparatively poor dimensional stability of PMMA suggests that new materials are needed for compact disk and video disk use.

Blends of polycarbonate (PC) and polymethyl methacrylate (PMMA) are known. However, references describing such blends invariably describe polycarbonate and polymethyl methacrylate as being immiscible in most proportions.

Z. G. Gardlund, in *Polymer Preprints*, vol. 23, pages 258–259 (1982) and American Chemical Society (ASC) *Advances in Chemistry*, Series 206, no. 9, pages 129–148 (1984) reports one or more indications of immiscibility in all PC/PMMA blends tested. Blend compositions ranged from 2 to 95 percent by weight PC, balance PMMA, on the dry basis. Visual observation showed that blends were opaque over the entire composition range, indicating polymer immiscibility, according to the *Advances in Chemistry* article. (The *Polymer Preprints* article describes a film prepared from a 2/98 PC/PMMA blend as being transparent).

K. K. Koo, et al, *Polymer Eng. Sci.*, vol. 27, pp 741–746 (1985), describing mechanical properties of several two-phase polymer systems including PC/PMMA, shows that 90/10 PC/PMMA blends have higher impact strength and greater elongation at break than pure PC, and characterizes PC/PMMA as a "toughened alloy".

U.S. Pat. No. 4,319,003 to Gardlund observes that blends of PC and PMMA are opaque and do not possess the advantageous properties of either polymer, and proposes instead a block copolymer of PMMA and PC.

DISCLOSURE OF THE INVENTION

It is an object of this invention to prepare blends of polycarbonate and a polyalkyl methacrylate in which the two polymers are miscible in all proportions.

A particular object of this invention is to prepare blends of polycarbonate and polymethyl methacrylate in which the two polymers are miscible in all proportions.

A related object of this invention is to provide clear, transparent, single phase polymer blends of polycarbonate and polymethyl methacrylate in proportions of PC and PMMA which heretofore have formed only two-phase, opaque or translucent blends.

Another object of this invention is to provide processes for forming polycarbonate/polymethyl methacrylate blends which will give clear, one-phase blends in all proportions of PC and PMMA.

According to one aspect of this invention, clear transparent, single phase blends of polycarbonate and a polyalkyl methacrylate, having a lower critical solution temperature (LCST) and containing from about 5 to about 95 percent by weight of polycarbonate and conversely from about 95 percent to about 5 percent by weight of a polyalkyl methacrylate, based on the total weight of polymer solids, are prepared. The alkyl radical contains from one to about 10 carbon atoms.

The preferred polycarbonate content is from about 10 to about 80 percent by weight, most preferably from about 30 to about 70 percent by weight; conversely, the preferred polyalkyl methacrylate content is from about 90 to about 20 percent by weight and most preferably from about 70 to about 30 percent by weight. Preferred blends are those of polycarbonate and polymethyl methacrylate.

A process for providing clear, transparent, one-phase blends of polycarbonate and polyalkyl methacrylate, particularly blends of polycarbonate and polymethyl methacrylate, is disclosed. According to this process, polycarbonate and a polyalkyl methacrylate are dissolved in a solvent having a boiling point above 30° C., thereby forming a mixed solution of PC and PMMA, and the solvent is evaporated at a temperature from about 30° C. to the boiling point of the solution, thereby forming the desired one-phase polycarbonate/polyalkyl methacrylate blend. The alkyl radical may contain from about 1 to about 10 carbon atoms. In particular, blends of polycarbonate (PC) and polymethyl methacrylate (PMMA) are formed in this manner. The proportions of polycarbonate to polyalkyl acrylate (preferably PMMA) are preferably from about 5 to about 95 percent PC, especially from about 10 to about 80 percent by weight of PC, most preferably from about 30 to about 70 percent by weight PC, and conversely from about 95 to about 5 percent by weight of polyalkyl methacrylate, especially from about 90 percent to about 20 percent by weight of polyalkyl methacrylate, most preferably from about 70 to about 30 percent by weight of polyalkyl methacrylate.

The one phase polycarbonate/polyalkyl methacrylate blends formed according to this invention are moldable, transparent and remain in one phase unless the molding temperature exceeds the phase separation temperature of the blend. The transparency of the blends is over 90 percent and comparable to those of pure PC and pure PMMA of equivalent thickness.

All polymer compositions throughout this specification are expressed in percentage by weight of each polymer component on the dry or polymer solids basis, unless a different basis is clearly indicated.

BEST MODE FOR CARRYING OUT INVENTION

Polymethyl methacrylate is the preferred polyalkyl methacrylate, and the description herein will be primarily with reference to PC/PMMA blends.

Blends of polycarbonate and polymethyl methacrylate according to the present invention are clear, transparent, single phase blends, regardless of the proportions of PC and PMMA present. This is also true of blends of polycarbonate with other polyalkyl methacrylates. (The term polyalkyl methacrylate herein refers only to those polyalkyl methacrylates in which the alkyl radical contains from 1 to about 10 carbon atoms). PC/PMMA blends of this invention are in marked contrast to prior art PC/PMMA blends, which are translucent or opaque two-phase blends unless the proportions of PC and PMMA are close to one end or the other of the composition spectrum.

The polycarbonate is a polyester of an aliphatic or aromatic dihydroxy compound and carbonic acid. In particular, the polycarbonate may be a polyester of bisphenol A [i.e., 2,2-bis(4-hydroxyphenyl)propane] and carbonic acid. The weight average molecular weight (Mw) may be in the range of about 10,000 to about 100,000, although this range is not critical. The preferred weight average molecular weight is from about 34,000 to about 58,000. A grade of polycarbonate which is suitable for structural purposes (e.g. lenses and nonbreakable windows) is preferred. A preferred material is "Lexan" 141, which is bisphenol A polycarbonate made by General Electric Company of Schenectady, N.Y. and having a weight average molecular weight (Mw) of $5.8 \times 10^4$.

The polymethyl methacrylate may be an injection molding grade suitable for making rigid transparent structures. The weight average molecular weight may be in the range of about 10,000 to about 1 million, although this is not critical. The preferred weight average molecular weight is from about 34,000 to about 100,000. A preferred material is "Plexiglas" V811, made by Rohm and Haas Co. of Philadelphia, Pa. and having a weight average molecular weight of about $8.5 \times 10^4$.

The molecular weight ranges herein specified for polymethyl methacrylate are applicable to other polyalkyl methacrylates as well.

The preferred polymer blends of this invention are binary blends of polycarbonate and polymethyl methacrylate, i.e. they are blends consisting of PC and PMMA (or other polyalkyl methacrylates), with no other polymers present. Additional polymers may be present in minor amounts, as long as the polymer components are completely miscible in the proportions selected and the resulting blend is clear and transparent. In other words, polymer blends consisting essentially of PC and PMMA (or other polyalkyl methacrylate) are within the purview of this invention. The total amount of any such additional polymer (or polymers) is ordinarily not over about 20 percent (preferably not over about 10 percent) of the total weight (dry basis) of the polymer blend, and the proportions of PC and PMMA (or other polyalkyl methacrylate) are about the same as in binary blends, i.e. about 5 to about 95 (preferably about 10-80, most preferably about 30-70) parts by weight of PC and conversely about 95 to about 5 (preferably about 90-20, most preferably about 70-30) parts by weight of PMMA based on the combined weights of PC and PMMA.

Particulate additives such as ultraviolet stabilizers, reinforcing agents, pigments and fillers can be incorporated in the polymer blends of this invention as desired. Such additives are generally not desired, however, because they adversely affect the transparency of the polymer blend. When such additives are present, they constitute a discontinuous phase dispersed in the polymer blend, which constitutes the matrix or continuous phase.

Polymer blends of this invention are preferably prepared by solution casting. According to this method, polycarbonate and polymethyl methacrylate are dissolved in a mutual solvent, such as tetrahydrofuran (THF) or cyclohexanone, to form a dilute solution (e.g. from about 2 to about 5 percent by weight of solids). This dilute solution is preferably spread in a thin layer on a smooth flat substrate surface (e.g., glass or stainless steel) from which the dry polymer blend will readily release. The solvent is then evaporated at a temperature from about 30° C. to the boiling point of the solvent under quiescent conditions. Actually, the maximum temperature is just below the boiling point of the solvent, since boiling should be avoided. The preferred evaporation temperature is from about 45° C. to the boiling point of the solvent. Evaporation may be carried out under atmospheric, subatmospheric or superatmospheric conditions. Evaporation of a thin layer of solution leaves a film of the desired PC/PMMA blend. This film is clear and transparent, indicating that only a single phase is present, regardless of the proportions of PC and PMMA. The existence of only a single phase can also be demonstrated by conventional analytical techniques. The proportions of PC and PMMA may range over the entire spectrum of compositions from pure PC to pure PMMA. Preferred proportions are those which give novel polymer blends according to this invention, i.e. 5 to 95 percent by weight of PC and 95 to 5 percent by weight of PMMA, preferably 10-80 percent by weight of PC and 90-20 percent by weight of PMMA, most preferably 30-70 percent by weight of PC and 70-30 percent by weight of PMMA.

Polymer blends of this invention can also be prepared by spray drying. According to this method, polycarbonate and polymethyl methacrylate are dissolved as described above, and the resulting solution is then spray dried to give a dried PC/PMMA blend. A flat collection surface to which PC/PMMA blend does not readily adhere may be used for forming a film of PC/PMMA blend.

The PC/PMMA blend can be formed in bulk instead of as a film if desired, by evaporating the solvent from the polymer solution in a suitable container instead of a thin layer. Care must be taken to avoid formation of bubbles when evaporating the solvent in this mode of operation.

Solution casting may be carried out batchwise or continuously as desired. For continuous operation, the polymer solution is cast onto a moving web which consititutes the substrate.

Polycarbonate/polymethyl methacrylate blends according to this invention may be used for nearly any purpose for which pure polycarbonate, blends of polycarbonate with other polymers, or polymethyl methacrylate can be used. These PC/PMMA blends are excellent candidates for compact disk applications because of the combination of high optical clarity, high dimensional stability and low birefrengence. This same combination of properties also makes these blends excellent candidates for various other uses, such as lenses and nonbreakable windows, where high optical clarity is required.

Blends of polycarbonate with other polyalkyl acrylates have the same uses in general as polycarbonate/polymethyl methacrylate blends.

Polymer blends of this invention are clear, transparent compositions, having transparencies in excess of 90 percent. They are also moldable thermoplastic materials. Blends of this invention have a single glass transition temperature, which depends on the composition of the blends. The glass transition temperature of PC/PMMA blends may range from about 105° C. to about 140° C., depending on the amounts of PC and PMMA present. Blends of polycarbonate with other polyalkyl methacrylates have lower glass transition temperatures than PC/PMMA blends having the same polycarbonate content.

This invention will now be described with reference to specific embodiments thereof, as illustrated by the following examples.

EXAMPLE 1

Various mixtures of bisphenol A polycarbonate ("Lexan" 141, Mw=58,000, General Electric Co.) and polymethyl methacrylate ("Plexiglas" V811, Mw=about 85,000, Rohm & Haas Co.) were prepared by dissolving the dry particulate polymers in tetrahydrofuran (THF) to give solutions containing 2 percent by weight of polymer solids. The mixtures prepared were 10/90, 20/80, 30/70, 40/60, 50/50, 60/40, 70/30, 80/20 and 90/10 PC/PMMA blends. (The percentage by weight of PC is given first and the percentage by weight of PMMA is given second in the above expression of composition). Solutions of pure PC and pure PMMA, also containing 2 percent by weight of polymer solids, were also prepared. Samples of these solutions were cast onto glass slides 0.16 ml. of solution per square centimeter of slide area) at 47° C. in a quiescent environment. The solvent was allowed to evaporate, leaving very thin (about 5 microns), completely transparent films. The film samples were dried at 70° C. in a vacuum oven and kept in a desiccator prior to testing.

Light scattering measurements and differential scanning colorimetry (DSC) scans were made on all polymer compositions prepared. Light scattering measurements were made according to a modification of the method disclosed in R. Tabar and R. S. Stein, *J. Polym. Sci.* Polym. Phys. Ed.) 20, 2041 (1985). DSC scans were obtained with a Dupont 9900 apparatus at a heating rate of 20° C. per minute. Both light scattering and DSC showed the existence of only a single phase in all compositions. DSC scans showed a single glass transition temperature (Tg) in all compositions, which is indicative of a single phase.

Cloud points were determined from light scattering data. The cloud point is dependent on both composition and heating rate. The cloud point is taken as the temperature at which an abrupt increase in light scattering intensity occurs as the sample is heated. Table I shows the variation of cloud point with composition at heating rates of 2° C./min and 10° C./min.

TABLE I

| Heating rate, °C./min | Cloud Point, °C. | |
|---|---|---|
| Composition (PC/PMMA) | 2° | 10° |
| 10/90 | >300 | — |
| 20/80 | 294 | — |
| 30/70 | 241 | 254 |
| 40/60 | 238 | 255 |
| 50/50 | 244 | 257 |
| 60/40 | 247 | 256 |
| 70/30 | 252 | 258 |
| 80/20 | >300 | — |
| 90/10 | >300 | — |

Cloud points of the 10/90, 80/20 and 90/10 PC/PMMA compositions were by turbidity measurement.

Polycarbonate/polymethyl methacrylate compositions of this invention exhibit a lower critical solution temperature (LCST), as shown by the cloud points in Table I. The LCST for the PC/PMMA system at a heating rate of 2° C./min is the lowest cloud point exhibited by any of the PC/PMMA blends; i.e. 238° C. (the cloud point of the 40/60 PC/PMMA blend). Blends according to this invention are clear and transparent at temperatures below the cloud point and translucent or opaque at temperatures above the cloud point.

EXAMPLE 2

The procedure of Example 1 was repeated except that the solution was cast into a Petri dish. The thickness of the solution layer being such as to give a film 50 microns in thickness upon evaporation of the solvent. Results were similar to those obtained in Example 1.

EXAMPLE 3

The procedure of Example 1 was followed expect that the solutions were cast as 30° C. The resulting polymer films were clear and transparent, indicating that a single phase was present.

COMPARATIVE EXAMPLE A

The procedure of Example 1 was followed except that the solution casting temperature was 23° C. All of the resulting films except those prepared from pure PC and pure PMMA were cloudy in appearance, indicating polymer phase separation.

EXAMPLE 4

The procedure of Example 1 is followed expect that polyethyl methacrylate, polybutyl methacrylate, and poly(2-ethylhexyl)methacrylate are substituted in turn for polymethyl methacrylate. Clear transparent films are obtained.

EXAMPLE 5

A 70/30 PC/PMMA film, oven dried at 70° C. and atmospheric pressure for 3 days, was placed into a mold consisting of two thin parallel plates separated by a thin spacer plate having a central slot which served as the mold cavity. The mold and its contents were placed on the platen of a press, and reheated to 180° C. at 1.2 tons per square inch (24,000 lbs per square inch, or 1690 kg/cm$^2$). The resulting molded product was transparent, having a transparency greater than 90 percent.

While in accordance with the patent statutes, a preferred embodiment and best mode has been presented, the scope of the invention is not limited thereto, but rather is measured by the scope of the attached claims.

What is claimed is:

1. A clear, transparent, single phase polymer blend of a polycarbonate and a polyalkyl methacrylate, said blend consisting essentially of from about 10 to about 80 percent by weight of a polycarbonate homopolymer and from about 90 to about 20 percent by weight of polyalkyl methacrylate, wherein said alkyl radical contains from one to about 10 carbon atoms, based on the weight of total polymer solids, said blend having a lower critical solution temperature.

2. A polymer blend according to claim 1 containing from about 30 to about 70 percent by weight of polycarbonate and from about 70 to about 30 percent by weight of polyalkyl methacrylate.

3. A polymer blend according to claim 1 in which said polyalkyl methacrylate is polymethyl methacrylate.

4. A polymer blend according to claim 3, said blend having a single glass transition temperature in the range of about 105° to about 140° C.

5. A polymer blend according to claim 1 in which the weight average molecular weight of said polycarbonate is in the range of about 10,000 to about 100,000 and the weight average molecular weight of said polyalkyl methacrylate is in the range of about 10,000 to about 1 million.

6. A polymer blend according to claim 1 in which the weight average molecular weight of said polycarbonate is in the range of about 34,000 to about 58,000 and the weight average molecular weight of said polymethyl methacrylate is in the range of about 34,000 to about 100,000.

7. A method for forming a clear, transparent, single phase polymer blend of a polycarbonate and a polyalkyl methacrylate having a lower critical solution temperature, wherein the alkyl radical of said polyalkyl methacrylate contains from 1 to about 10 carbon atoms, said method comprising:

a. dissolving said polycarbonate and said polyalkyl methacrylate in a solvent having a boiling point above 30° C., thereby forming a mixed solution of said polycarbonate and polyalkyl methacrylate, and b. evaporating said solvent at a temperature from about 30° C. to the boiling point of the solvent, thereby forming said polymer blend in dry solid form.

8. A method according to claim 7 in which said solvent has a boiling point above 45° C. and said solvent is evaporated at a temperature from about 45° C. to the boiling point of the solvent.

9. A method according to claim 7 in which said polymer blend contains from about 5 to about 95 percent by weight of polycarbonate and from about 95 to about 5 percent by weight of polyalkyl methacrylate.

10. A method according to claim 7 in which said polymer blend contains from about 10 to about 80 percent by weight of polycarbonate and from about 90 to about 20 percent by weight of polyalkyl methacrylate.

11. A method according to claim 7 in which said polymer blend contains from about 30 to about 70 percent by weight of polycarbonate and from about 70 to about 30 percent by weight of polyalkyl methacrylate.

12. A method according to claim 7 in which said polyalkyl methacrylate is polymethyl methacrylate.

13. A polymer blend according to claim 1 in which said polycarbonate is a polyester of an aromatic dihydroxy compound and carbonic acid.

14. A polymer blend according to claim 1 in which said polycarbonate is a polyester of bisphenol A and carbonic acid.

15. A method according to claim 7 in which said polycarbonate is a polyester of bisphenol A and carbonic acid.

* * * * *